United States Patent
Huhnd et al.

(10) Patent No.: US 9,267,863 B2
(45) Date of Patent: Feb. 23, 2016

(54) PROPELLER SYSTEM WITH TWO COUNTER-ROTATING PROPELLERS, A METHOD FOR MEASURING THE THRUST OF A PROPELLER SYSTEM WITH TWO COUNTER-ROTATING PROPELLERS AND WIND TUNNEL WITH A MODEL POSITIONED THEREIN HAVING A PROPELLER SYSTEM

(75) Inventors: Michael Huhnd, Thedinghausen (DE); Erik Goldhahn, Bremen (DE); Stephan Zipp, Bremen (DE); Alberto Villa, Bremen (DE)

(73) Assignee: Airbus Operations GmbH (DE)

(*) Notice: Subject to any disclaimer, the term of this patent is extended or adjusted under 35 U.S.C. 154(b) by 1022 days.

(21) Appl. No.: 13/415,024

(22) Filed: Mar. 8, 2012

(65) Prior Publication Data

US 2012/0232808 A1    Sep. 13, 2012

Related U.S. Application Data

(60) Provisional application No. 61/451,273, filed on Mar. 10, 2011.

(30) Foreign Application Priority Data

Mar. 10, 2011 (DE) .................. 10 2011 013 517

(51) Int. Cl.
*G06F 19/00* (2011.01)
*F01D 25/00* (2006.01)
(Continued)

(52) U.S. Cl.
CPC . *G01M 9/04* (2013.01); *G01L 5/133* (2013.01)

(58) Field of Classification Search
CPC .. B64D 2027/005; Y02T 50/66; B64C 11/16; G01M 9/04; G01L 5/133; G06F 19/00; F01D 25/00

USPC .......................................................... 702/41
See application file for complete search history.

(56) References Cited

U.S. PATENT DOCUMENTS 2,699,304 A * 1/1955 Treseder et al. .......... 244/134 D
4,537,066 A    8/1985 Simpson
(Continued)

FOREIGN PATENT DOCUMENTS

DE          3340516 A1     5/1984

OTHER PUBLICATIONS

L.A. Van Gunsteren (A Contribution to the Solution of Some Specific Ship Propulsion Problems—A Reappraisal of Momentum Theory, Dec. 12, 1973, available at http://engineering.dartmouth.edu/epps/openprop/files/Laskos_2010_MS_thesis.pdf.*

(Continued)

*Primary Examiner* — Mohamed Charioui
*Assistant Examiner* — Ruihua Zhang
(74) *Attorney, Agent, or Firm* — Lerner, David, Littenberg, Krumholz & Mentlik, LLP

(57) ABSTRACT

A propeller system with two propellers, arranged one behind the other and separated by a propeller gap, respectively comprising a propeller hub and at least one rotating force measuring device, comprises at least two differential pressure sensors and an evaluation unit. The rotating force measuring devices are mechanically connected to the respective propellers and are adapted for determining the individual thrust force of each propeller. At least one of the said differential pressure sensors is arranged on or in each propeller and is adapted for measuring a differential pressure between the propeller gap and the respectively opposing side of the propeller. By adding the measured individual thrust forces and by subtracting the gap area forces that are based on the respectively measured differential pressures, the evaluation unit can determine a precise overall thrust force for the propeller system.

6 Claims, 2 Drawing Sheets

(51) Int. Cl.
*G01M 9/04* (2006.01)
*G01L 5/13* (2006.01)

(56) References Cited

U.S. PATENT DOCUMENTS

| | | | | |
|---|---|---|---|---|
| 4,788,855 | A | * | 12/1988 | Laskody .................. 73/112.04 |
| 5,054,998 | A | * | 10/1991 | Davenport ...................... 416/1 |
| 6,478,641 | B2 | * | 11/2002 | Jordan ........................... 440/75 |
| 7,384,239 | B2 | * | 6/2008 | Wacinski ..................... 416/128 |
| 7,565,269 | B2 | | 7/2009 | Parfitt et al. |
| 8,661,781 | B2 | * | 3/2014 | Moore et al. ................... 60/204 |
| 8,813,581 | B2 | * | 8/2014 | Huhnd et al. ............. 73/862.69 |
| 2007/0081888 | A1 | * | 4/2007 | Harrison ........................ 415/47 |

OTHER PUBLICATIONS

Dunham et al (Low-Speed Wind-Tunnel Tests of Single- and Counter-Rotation Propellers, NASA Technical Memorandum 87656.*

George L. Stefko and Robert J. Jeracki, Porous Wind Tunnel Corrections for Counterrotation Propeller Testing, NASA Technical Memorandum 100873, 15th Aerodynamic Testing Conference, American Institute of Aeronautics and Astronautics, San Diego, CA, May 18-20, 1988.*

* cited by examiner

PROPELLER SYSTEM WITH TWO COUNTER-ROTATING PROPELLERS, A METHOD FOR MEASURING THE THRUST OF A PROPELLER SYSTEM WITH TWO COUNTER-ROTATING PROPELLERS AND WIND TUNNEL WITH A MODEL POSITIONED THEREIN HAVING A PROPELLER SYSTEM

CROSS-REFERENCE TO RELATED APPLICATIONS

This application claims the benefit of the filing date of U.S. Provisional Patent Application No. 61/451,273 filed Mar. 10, 2011, the disclosure of which is hereby incorporated herein by reference.

TECHNICAL FIELD

The invention relates to a propeller system comprising two counter-rotating propellers, arranged one behind the other and separated by a propeller gap, a method for measuring the thrust of a propeller system comprising two counter-rotating propellers, arranged one behind the other and separated by a propeller gap and also a wind tunnel with a model positioned therein having such a propeller system.

BACKGROUND OF THE INVENTION

The conventional practice for determining the propeller forces to which wind tunnel models are subjected, is to use propeller force balances in the form of rotating force measuring devices. These are also known in English as "rotating shaft balances" (RSB) and are positioned between the propeller and a drive shaft. As well as measuring the forces and moments arising in the plane of rotation, this also measures both the thrust and the torque on the propeller shaft induced by the resistance of the propeller, which run vertically in relation to the plane of rotation.

Measuring the thrust of a propeller is a particular feature when measuring propeller forces, because, as the propeller rotates, an air pressure profile is formed in the gap between the propeller hub and the associated drive mechanism or any other fixed element which is detected by the force measuring device as an apparent thrust. In order to calculate this apparent thrust, pressure sensors are positioned on a fixed surface facing the propeller hub, which can calculate the pressure and the pressure distribution in the gap. The apparent thrust can be calculated from the pressure distribution and a knowledge of the surface exposed to this air pressure and then subtracted from the thrust measured by the force measuring device, so that the aerodynamic forces actually created by the propeller can be determined.

In the case of counter-rotating propeller systems with two propellers, there is not just one gap on one side of an individual propeller, but a total of three gaps, in which a corresponding air pressure profile develops. However, calculating pressure distributions in the gaps of such counter-rotating propeller systems is very costly.

DE 33 40 516 A1 and U.S. Pat. No. 7,565,269 B2 disclose methods for correcting total thrust measurements for aircraft engines, in which methods resistances are substracted that depend on the air flow into the engine and through a test cell.

U.S. Pat. No. 4,788,855 A discloses an apparatus for determining the thrust of an engine, comprising a force measuring device and a dynamometer.

BRIEF SUMMARY OF THE INVENTION

The object of the present invention may be seen to propose a propeller system comprising counter-rotating propellers that allows a precise calculation of the total thrust in a manner technically and mechanically as simple as possible while taking account of the gap phenomena indicated above.

This object is met by a propeller system that comprises two propellers positioned one behind the other and separated by a propeller gap having the features of independent claim 1. Advantageous further developments can be found in the subsequent claims.

The use of fixed pressure measuring sensors in order to determining pressure distribution in propeller gaps is very complex in propeller systems with two counter-rotating propellers, as in all cases a fixed, non-rotating counter-element is necessary for the positioning of the pressure sensors. In practice, this is not possible for gaps between two counter-rotating propellers. The core of the invention clearly deviates from the state of the art in that at least one pressure sensor is installed for each propeller instead of each gap. This pressure sensor is configured as a differential pressure sensor that calculates the pressure difference through the propeller hub, that is, between the suction side and the pressure side of the propeller.

A propeller within the sense of the present invention is a rotating propeller hub with propeller blades attached and with a rotating shaft balance (RSB), whereby the RSB could be arranged either in or on the propeller hub.

Between the counter-rotating propellers of a flight model positioned in a wind tunnel and between the propellers and the fixed connecting pieces, the arrangement does not usually comprise two simple flat surfaces with a pre-defined constant distance between them, but rather irregularly shaped bodies rotating in a radial direction, having a partially open cross-section. Consequently, there could be a flow between the openings in the cross-section, which could have the effect of varying the pressure conditions over the radius.

However, a differential pressure sensor positioned on a propeller hub or on the RSB can at all times calculate the pressure difference between the propeller gap and the side of the propeller that is turned away from the central propeller gap between the two counter-rotating propellers. This means that, from a drive side, this device can measure the pressure difference at the central propeller gap and at the same time the pressure difference from this central propeller gap towards the suction side of the propeller system. In this way, the respective pressure differences that give rise to a theoretical, gap-induced portion of the thrust can be calculated, so that the resulting "false" thrust force can be eliminated from the total thrust forces measured by the force measuring devices on the basis of knowing the respective areas that are subjected to pressure differences.

In a procedure of this type, the differential pressure sensors can only be realized as differential pressure sensors that rotate together with the respective propellers, because with fixed differential pressure sensors, costly pressure measuring lines would need to be passed into the respective gap through the propeller and secured to a fixed part of the propeller system. In view of the usually restricted dimensions of the gap, this would prove very costly and prone to error.

The pressure values measured by the differential pressure sensors can be transmitted in the form of electrical signals through a telemetry unit, for example together with the signals provided by the force measuring devices, to a fixed evaluation unit. The telemetry unit could, for example, be for each propeller in the form of a maintenance-free pair of coils forming a transducer or in the form of an arrangement of slip rings.

The propeller system in accordance with the present invention with two propellers positioned one behind the other and separated by a central propeller gap is thus so configured that each propeller has at least one rotating measuring device, at least two differential pressure sensors and an evaluation unit, whereby the rotating force measuring devices are mechanically connected to the respective propellers and so configured as to measure at least one thrust force for each propeller.

At the same time, at least one of the at least two differential pressure sensors is so arranged and configured that it can measure a differential pressure between the central propeller gap and the respective opposing side of the propeller in question. The respective differential pressure sensor thus extends from one suction side to a pressure side of the respective propeller and could be incorporated into a propeller hub. The attachment positions for differential pressure sensors will depend upon the geometry of the gap and the available attachment possibilities. In order to determine a radial pressure gradient, at least two differential pressure sensors will be required along the radius of the gap, neither of which can be accommodated in the usually very thin propeller hub.

In addition, the evaluation unit is so configured that, by adding the individual measured thrust forces of the propellers and by subtracting the gap plane forces, which are based on the respective measured differential pressures after being multiplied by the affected areas for each propeller, an effective total thrust force of the propeller system can be obtained. However, the evaluation unit must be capable, through an electrical connection with the differential pressure sensors and the force measuring devices, of retaining both the measured thrust forces and the measured differential pressures through the propellers for further processing.

As it cannot be assumed that there will be at all times a constant pressure profile in the respective propeller gaps, it is advisable in an advantageous embodiment to position at least two differential, radially distanced pressure sensors for each propeller. In this way, a pressure difference can be measured at a minimum of two circular areas leading to a more precise calculation of an average pressure and thereby to a more precise result of the respective gap plane forces.

At the same time, it is especially advantageous if, at each propeller, three or more differential pressure sensors can be so arranged that they are radially distanced, as in this way the resolution can be increased even further. The larger the respective propeller and its propeller hub, the greater the choice of the number of differential pressure sensors will be for an accurate illustration of the pressure profile to be obtained.

It is especially preferred that the evaluation unit is adapted so that a radial pressure distribution can be determined from a number of radially distanced differential pressure sensors so that effectively an effective average pressure can be calculated.

A further core feature of the present invention can be found in a method for determining the thrust force of a propeller system comprising two propellers positioned one behind the other and separated by a propeller gap, having the features of the subsequent independent claim. The core aspects of the process according to the invention lie in the fact that in each case a pressure profile in all gaps adjoining the propellers can be determined by measuring pressure differences between a suction side and a pressure side of the propellers in the adjoining gaps. From this, the resulting forces and the forces acting on the boundary surfaces of the propellers facing the gaps can be calculated and then subtracted from a thrust force of the propellers measured by rotating force calculation devices.

A further aspect of the present invention lies in providing a model arranged in a wind tunnel that comprises a propeller system of this type, which propeller system permits a precise measuring of the forces acting on the propellers and enabling aerodynamic investigations in the wind tunnel to be improved.

DETAILED DESCRIPTION

Figure 1A:
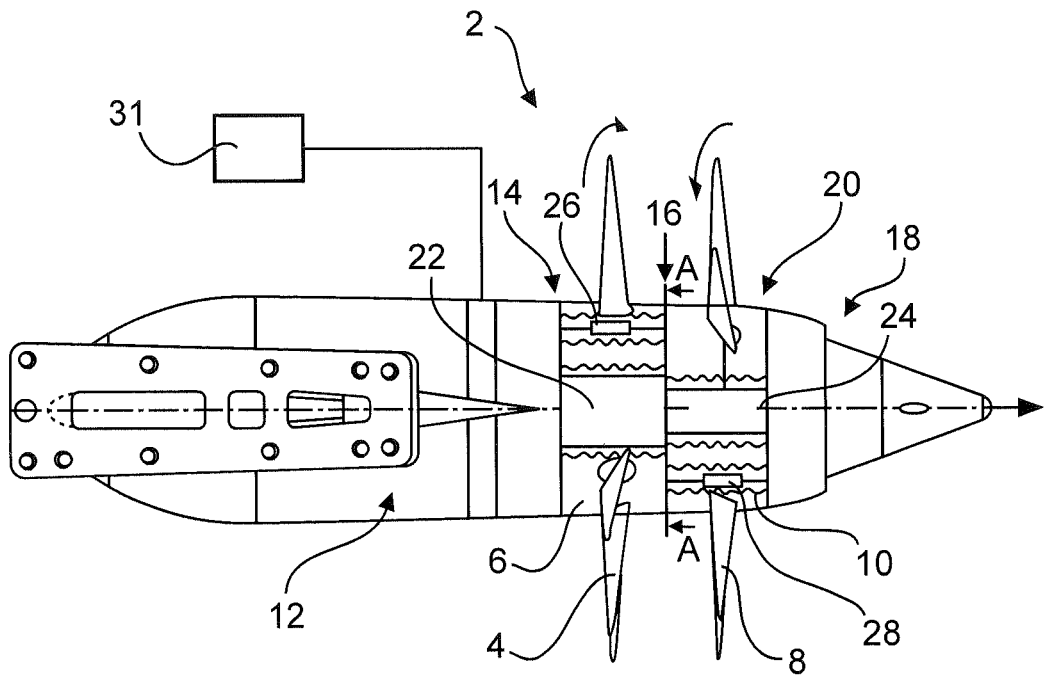
FIGS. 1a and 1b show an embodiment of a propeller system according to the invention having two counter-rotating propellers and three propeller gaps and differential pressure sensors.

FIG. 1a depicts a propeller system 2 according to the invention, comprising a first propeller 4 with a first propeller hub 6 and a second propeller 8 with a second propeller hub 10, which are driven in a counter-rotating manner by a drive unit 12 and which generate a thrust force in an x-direction. In this arrangement, there is, between the first propeller hub 6 and the drive unit 12, that is to say on the pressure side of the propeller system 2, a first propeller gap 14, and between the second propeller hub 10 and the first propeller hub 6, there is a second propeller gap 16 referred to below as "the central propeller gap". Moreover, before the second propeller hub 10 and a pointed section 18, that is to say, on the suction side of the propeller system 2, there is a third propeller gap 20. In all three propeller gaps 14, 16 and 20, uneven air pressure distributions arise because of the pressure difference between the respective suction and pressure sides, caused by the flow movements around the outer contour and through open cross-sections of the propeller hubs caused by the rotating shaft balances arranged either in or on the latter. These uneven air pressure distributions act on the propeller hubs 6 and 10 in the form of pressure forces.

Force measuring devices 22 and 24 are employed in order to measure the thrust force of the propeller system 2, are positioned respectively between a drive shaft (not shown) and the respective propeller 4 and 8 and can be in the form of rotating shaft balances or RSB. As practically all forces and moments arising at the propellers 4 and 8 can be measured by the force measuring devices 22 and 24, the thrust force generated by the respective propeller 4 or 8 can also be determined. However, as there are gap forces that arise in the propeller gaps 14, 16 and 20 parallel to the respective thrust forces, these tend to distort the respective value calculated for the thrust force. In particular, if such propeller systems are used in wind tunnels for the precise validation of mathematically calculated data, it is absolutely essential that the greatest possible accuracy is obtained in determined the propeller forces.

According to the invention, the differential pressure sensors 26 and 28 in the propeller hubs 6 and 10 are respectively adapted in such a way that the pressure difference between the two adjoining propeller gaps 14 and 16 can be measured for the first propeller hub 6 and the pressure difference between the adjoining propeller gaps 16 and 20 can be measured for the second propeller hub 10.

The first differential pressure sensor 26 can thus measure a pressure difference between the first propeller gap 14 and the second propeller gap 16. It must be assumed that the first propeller hub 6 has two peripheral surfaces of the same size, so that by knowing an average pressure difference for these two peripheral surfaces, an effective force in an X direction on the first propeller hub 6 can be determined. At the same time, the second differential pressure sensor 28 is able to measure a pressure difference between the central propeller gap 16 and the third propeller gap 20, with the result that an effective force generated solely by the gap effects on the second propeller hub 10 can be determined.

The calculated force values and pressure values are transferred to an evaluation unit 31, which is connected to both the force measuring devices 22 and 24 and the differential pressure sensors 26 and 28, either through a telemetry device with the aid of a pair of coils or through a set of slip rings. These telemetry devices are already known under the state of the art and are not shown in detail.

Figure 1B:
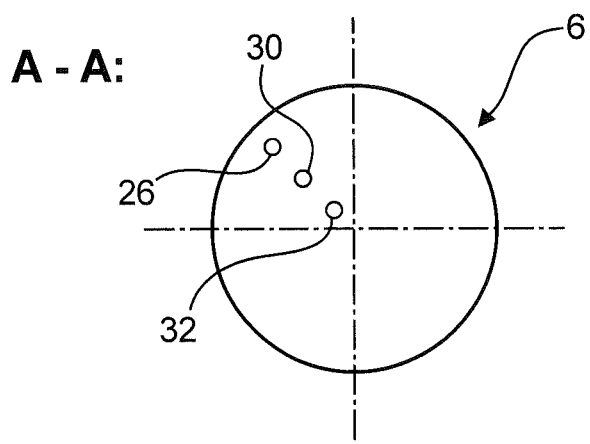

To increase the accuracy when measuring differential pressure at the propeller hubs, a number of differential pressure sensors 26 and 28 can be used, which are radially distanced over the respective boundary surfaces. For example, FIG. 1*b* contains a plan view of a boundary surface of the first propeller 4, pointing in the direction of the suction side of the propeller system 2, that is, in the direction of thrust. There, by way of example, three differential pressure sensors 26, 30 and 32 are radially distributed and allow the differential pressure to be measured at three radially distanced points of the first propeller 4. As it cannot be assumed with any degree of certainty that the pressure distribution is uniform in all the propeller gaps 14, 16 and 20, as these may vary radially outwards from a central point of rotation, a larger number of differential pressure sensors can be used to measure a pressure field or a pressure distribution with greater accuracy. From these different measuring points, it is also possible to establish an effective average pressure, which can be used as a basis for determining the gap forces that distort the thrust measurement.

Figure 2:
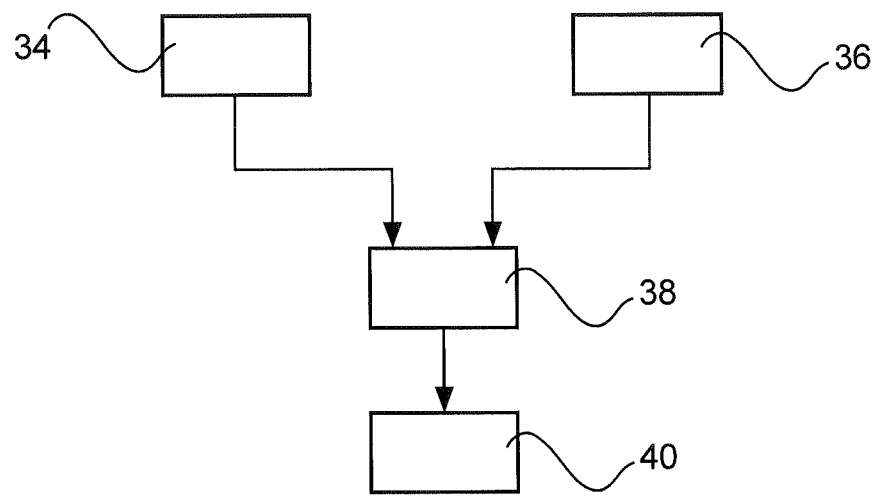
FIG. 2 shows a block circuit diagram of the method according to the invention.

FIG. 2 shows a schematic, block-based representation of the method according to the invention. Essentially, the said method comprises measuring 34 of a differential pressure through a first propeller between the adjoining propeller gaps, measuring 36 of at least one differential pressure through a second propeller between the adjoining propeller gaps, whereby the first propeller and the second propeller are both in contact with two propeller gaps. After that, the effective force acting on each propeller hub is calculated 38 and subtracted 40 from a thrust force that is measured by force measurement devices positioned on or in the propeller hubs.

Figure 3:
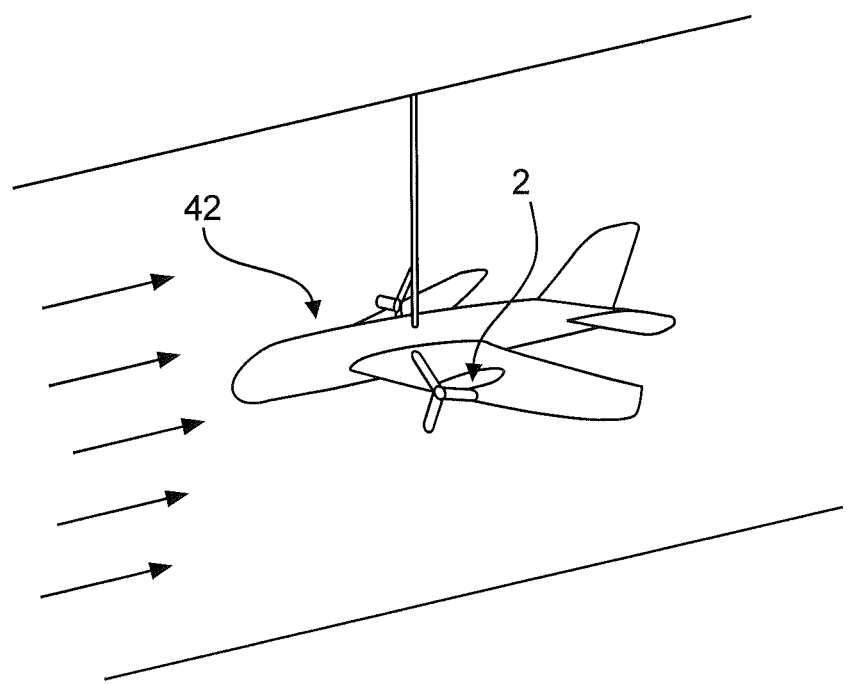
FIG. 3 shows a wind tunnel in which a model is positioned, having a propeller system according to the invention.

Lastly, FIG. 3 shows the use of a propeller system 2 according to the invention arranged on a model 42 positioned in a wind tunnel, which is used to confirm mathematically calculated aerodynamic or mechanical flow data.

Finally, it must be stressed that the terms "comprising" are not intended to preclude other elements or steps and that "a" or "an" does not preclude a plural form. It is also stressed that features or steps, described by means of references to one of the above embodiments, can also be used in combination with other features or steps of other embodiments described above. Reference marks contained in the claims are not to be seen as being a limitation.

REFERENCES

2 Propeller system
4 First propeller
6 First propeller hub
8 Second propeller
10 Second propeller hub
12 Drive unit
14 First propeller gap/propeller side
16 Second (central) propeller gap
18 Pointed section
20 Third propeller gap/propeller side
22 Force measurement device
24 Force measuring device
26 Differential pressure sensor
28 Differential pressure sensor
30 Differential pressure sensor
31 Evaluation unit
32 Differential pressure sensor
34 Measuring a differential pressure
36 Measuring a differential pressure
38 Differential pressure calculation
40 Subtracting thrust force
42 Wind tunnel model

The invention claimed is:

1. A propeller system comprising:
first and second propellers positioned one behind the other and separated by a first propeller gap, and having a first and a second propeller hub, respectively, and at least a first and a second rotating force measuring device, respectively,
at least first and second differential pressure sensors, and
an evaluation unit,
wherein the first and second rotating force measuring devices are mechanically connected to the respective first and second propellers and are so configured that they can measure the individual thrust force of the respective propeller;
wherein at least one of the first and second differential pressure sensors is arranged on or in each of the first and second propellers and is configured for measuring a differential pressure between the first propeller gap positioned between the first and second propellers and a second and a third propeller gap on an opposing side of the respective first and second propellers, and
wherein the evaluation unit is configured for determining a total thrust force of the propeller system by adding the measured individual thrust forces of the first and second propellers and by subtracting the gap area forces based on the respectively measured differential pressures.

2. The propeller system of claim 1, wherein at least two radially distanced differential pressure sensors are arranged on each of the first and second propellers.

3. The propeller system in accordance with claim 1, whereby three or more radially interspaced differential pressure sensors are arranged on each of the first and second propellers.

4. The propeller system in accordance with claim 2, wherein the evaluation unit is configured for determining an average differential pressure from a number of radially distanced differential pressure sensors.

5. A method for calculating the thrust force of a propeller system having a first and a second propeller separated by a first propeller gap and respectively in contact with a second and a third propeller gap, comprising:

measuring, by a first differential pressure sensor, at least one first differential pressure through a first propeller between the adjoining first and second propeller gaps, measuring, by a second differential pressure sensor, at least one second differential pressure through a second propeller between the adjoining second and third propeller gaps, calculating respectively an effectively acting force from the measured pressure difference for each of the first and second propellers, and subtracting the effectively acting forces from a measured thrust force of the first and second propellers.

6. A wind tunnel with a wind tunnel model positioned therein, comprising at least one propeller system, the at least one propeller system comprising:

first and second propellers positioned one behind the other and separated by a first propeller gap, and having a first and a second propeller hub, respectively, and at least a first and a second rotating force measuring device, respectively, at least first and second differential pressure sensors, and an evaluation unit, wherein the first and second rotating force measuring devices are mechanically connected to the respective first and second propellers and are so configured that they can measure the individual thrust force of the respective propeller;

wherein at least one of the first and second differential pressure sensors is arranged on or in each of the first and second propellers and is configured for measuring a differential pressure between the first propeller gap positioned between the first and second propellers and a second and a third propeller gap on an opposing side of the respective first and second propellers, and wherein the evaluation unit is configured for determining a total thrust force of the propeller system by adding the measured individual thrust forces of the first and second propellers and by subtracting the gap area forces based on the respectively measured differential pressures.

\* \* \* \* \*